Figure 1:
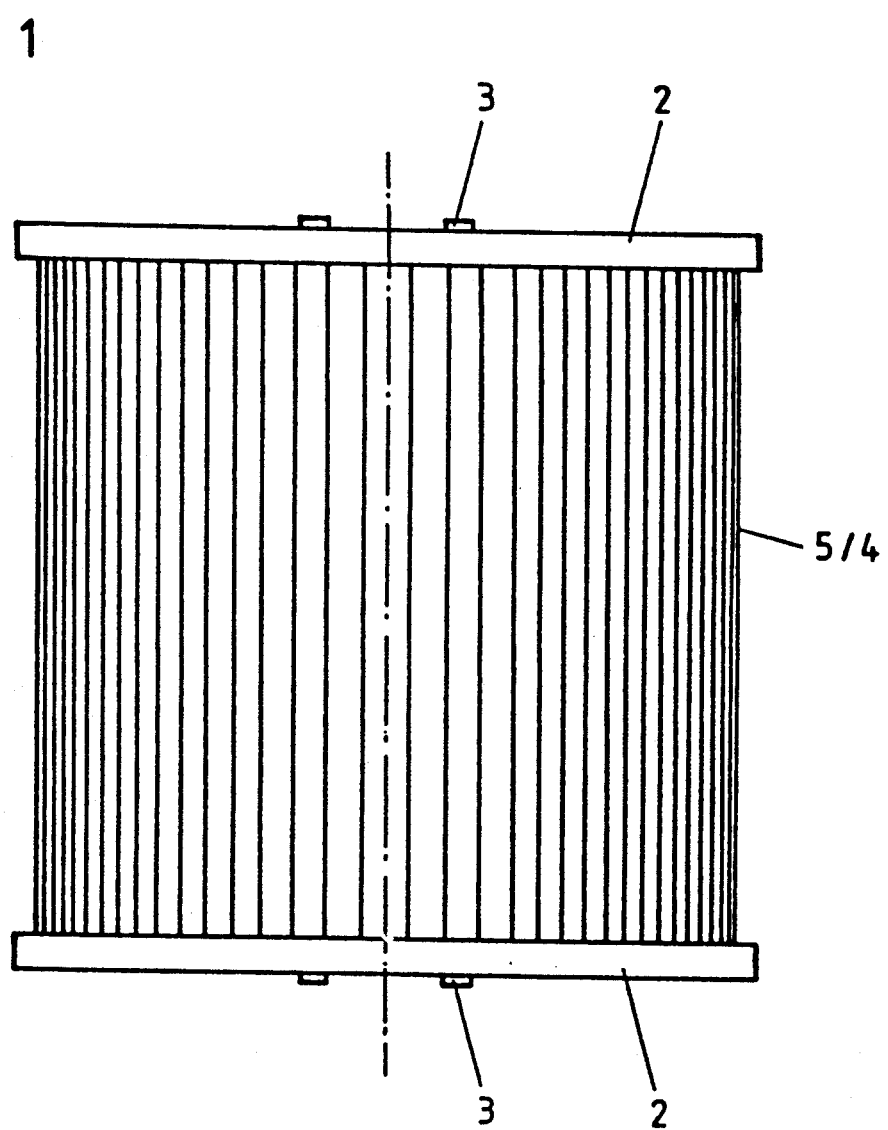

United States Patent [19]

Meyer

[11] Patent Number: 5,232,595

[45] Date of Patent: Aug. 3, 1993

[54] DEEP BED FILTER, METHOD OF MANUFACTURE OF A FILTER LAYER AND A FILTER MODULE

[75] Inventor: Karl-Otto Meyer, Bischofszell, Switzerland

[73] Assignee: Filtrox-Werk AG, St. Gallen, Switzerland

[21] Appl. No.: 723,215

[22] Filed: Jun. 28, 1991

[30] Foreign Application Priority Data

Jul. 5, 1990 [CH] Switzerland ............... 2239/90

[51] Int. Cl.$^5$ ............................. B01D 27/06
[52] U.S. Cl. ..................... 210/493.1; 210/483; 210/496; 210/500.26; 210/509; 55/97
[58] Field of Search ............... 210/493.1, 483, 487, 210/488, 489, 346, 500.26, 509, 496, 489; 55/97

[56] References Cited

U.S. PATENT DOCUMENTS

| | | |
|---|---|---|
| 3,115,459 | 12/1963 | Giesse ............................. 210/487 |
| 3,591,010 | 7/1971 | Pall et al. ....................... 210/493.1 |
| 4,032,457 | 6/1977 | Matchett ......................... 210/509 |
| 4,089,783 | 5/1978 | Holyoak ......................... 210/487 |
| 4,704,207 | 11/1987 | Chu ................................. 210/347 |
| 5,084,178 | 1/1992 | Miller et al. ................... 210/493.1 |

FOREIGN PATENT DOCUMENTS 3316540 11/1984 Fed. Rep. of Germany .
3805299 11/1988 Fed. Rep. of Germany .

*Primary Examiner*—Robert A. Dawson
*Assistant Examiner*—David Reifsnyder
*Attorney, Agent, or Firm*—Shoemaker and Mattare, Ltd.

[57] ABSTRACT

A deep bed filter with a layer thickness of at least 1 mm comprises a pleated, self supporting filter layer (7, 8) which contains a mixture of long fibered material and short fibered material, whereby the fibers comprise cellulose and/or artificial fibers and whereby the filter layer preferably contains diatomaceous earth and/or perlite.

18 Claims, 7 Drawing Sheets

DEEP BED FILTER, METHOD OF MANUFACTURE OF A FILTER LAYER AND A FILTER MODULE

The invention concerns a deep bed filter with fluid connections for the separating out of materials suspended in fluids, a method for manufacturing a filter layer and a filter module.

Deep bed filters for separating out contaminants from liquids are already known and in use in the most varied forms. Thus for example, a deep bed filter is made know in the German Patent Specification 33 16 540, where the filter layer comprises numerous thin permeable membrane layers which are arranged at intervals perpendicular to the main current direction, spaced one behind the other. This arrangement thus concerns stepped filtration with consecutively coordinated membrane filters.

An integral filter is made known through DE-AL-38 05 299, whereby a permeable tubular jacket of numerous tube-formed filter elements is intended, with differing filtration properties. In this case, the tubular jacket can have a "pleated" shape. The pleated filter cartridges comprise grid shaped, perforated securing members which provide the filter cartridges with the necessary radial and axial stability to withstand pressure and tensile loads. Capillary membranes, glass fiber filters or similar are mainly used as the filter medium. As a filtration aid, diatomaceous earth (Kieselguhr), perlite, asbestos or cellulose is anticipated. To increase the clarifying effect, diatomaceous earth is intended to be introduced into the intermediate space between two filter cartridges which are arranged one within the other.

It is already known that pleated filter papers and pleated membrane filters are also used mainly as air filters in the most varied forms. The advantages of large filter surfaces within the smallest of spaces, as well as low flow speeds as a result of the large filter surfaces, are obvious.

Lenticular modules are also known, whereby numerous disk shaped, self supporting filter layers, connected with one another at their edge areas, are arranged in a common housing and are subjected to a flow-through. This type of lenticular module is described, for example, in the U.S. Pat. No. 4,704,207.

Lenticular modules with this type of construction have been in use for many years, but possess, however, a number of drawbacks:

They tend to shed individual lenses during sterilisation and subsequent cooling;

Under severe operating conditions the modules can easily burst during cooling after the sterilisation procedure;

They contain a large number of seals, through which the risk of the passage of contaminants through the filter is increased;

In the case of contact between the lenses, (contact of the flow surfaces of neighbouring lenses of the same module), which in practice occurs frequently, the effective filter surface cannot be fully exploited and as a result changes in flow patterns occur; finally, lenticular modules are not able to be rinsed by reverse flow without rupture.

A module with pleated filter layers avoids these disadvantages. A further advantage is that a larger effective filter surface is able to be accommodated in the case of a module with pleated filter layers when compared with a lenticular module, when considering units with the same module volume.

Deep bed filter layers have been known for almost 80 years. Soon after the emergence of lenticular modules on the basis of deep bed filters, the desire arose to raise the effective filter surface per unit volume of the module by folding the filter layers. Until now, pleating of self supporting filter layers of cellulose and diatomaceous earth and/or perlite in one layer thickness, as they are employed, by comparison, for lenticular modules, has not been successful. Obviously the expert would be discouraged by the thought that these brittle and unelastic filter layers would not withstand the tensile loads occurring during the pleating procedure and would crack or break; and through that the clarifying effect achieved by the filter layers would be intolerably reduced or even terminated.

The invention overcomes this problem and enables the creation of a deep bed filter with a layer thickness of at least 1 mm, preferably 2-3 mm, with a pleated, self supporting filter layer which contains a mixture of long and short fibered materials of cellulose and/or artificial fibers or microglass fibers or ceramic fibers and preferably diatomaceous earth and/or perlite. With that, the invention primarily creates, in a completely surprising way, a pleatable deep bed filter layer and enables a major technical advance to be made, up until now held to be impossible in this fully investigated area.

Cellulose is well suited to pleating and is at the same time a good filtering material.

Artificial fibers have the advantage that they are better able to be chemically regenerated (for example with a natron lye) and that they do not have to be pre-rinsed. According to the invention, "long fibers" are taken to mean fibers with a length of between approximately 1 mm and 6 mm. Short fibers, according to this definition, are shorter than 1 mm. The invention can be realised in a particularly advantageous way with a long fiber portion of at least 20% W. The long fiber portion can vary, according to the type of use and the amount of short fibers. In the case of filters for use in sterile filtration, smaller long fiber portions, for example, are desireable in order to prohibit the passage of micro-organisms.

Especially good pleating properties will result if the fibers exhibit a fiber distribution whereby at least 5% W of the fibers possess a length of between approximately 3 mm to 6 mm. With that it is advantageous if at least 10% W of long fibers are provided with a length of 1 mm to 3 mm. Both the filtration properties as well as the pleating properties will be equally satisfactory if the filter layer contains at least 20% W and at most 50% W short fibers with a length less than 1 mm. A satisfactory distribution of fibers can be achieved, in the case of cellulose, for example, if the fibers are ground to a value of 12 to 25 degrees Schopper Riegler.

The cellulose fibers employed in accordance with the invention permit, to advantage, at least part replacement or enhancement through artificial fibers. With that, particularly suitable are Polypropylene-Polyethylene-homo- or copolymers, polyester, polymide-polycrylnitrile-fibers in a fiber length of approximately 0.4 to 3.00 mm and in a fiber thickness of 10 to 80 $\mu$m, preferably in the form of high fibrillated synthetic pulp with a specific surface of $=1$ m/g, as well as staple fibers with a length of maximum 6 mm and titres in the region of 1-4 dtex. The artificial fiber portion can, at the same time, amount to 100% W of the cellulose fibers.

(Percentage figures are the weight percentage in a dry condition, with a residual moisture content of approximately 2%).

According to the invention, ceramic fibers can be employed with advantage. This type of ceramic fiber, of silizium or aluminium oxide, with a fiber thickness of 10 μm or less, and with a fiber length of less than 6 mm, is available, for example, from the company DYKO-MORGAN Fiber technology GmbH, D-4000 Düsseldorf 11 (BRD). (The ceramic fibers are brought to the appropriate fiber length in a Highshearing Process in aqueous emulsion).

The "micro-glass fibers" from the company Bayer AG, D-5090 Leverkusen, or other comparable micro-glass fibers, are likewise employed with the distribution according to the invention. These types of glass fibers possess a fiber diameter of between 0.5 and 3.0 μm.

Deep bed filters, in accordance with the invention, can also be manufactured without the addition of filtration aids such as diatamaceous earth or perlite.

A good retention performance, together with good ability to pleat, will mainly result if the proportion of diatomaceous earth and/or perlite is larger than 20% W and less than 50% W in relation to the total weight of the filter layer, and if preferably the short fibered cellulose is present in a highly ground form. (The percentage data relate, in this case, to a dry filter layer with a residual moisture content of approximately 2%).

Filtration performance and the ability to pleat are contradictory properties of a deep bed filter layer. They depend to a large degree on the diatomaceous earth content. A particularly satisfactory compromise, with regard to both properties, is arrived at with layers containing diatomaceous earth/perlite in the region of 35 to 45% W in relation to the total weight of the filter layer.

According to the invention, these deep bed filters permit application as stepped filtration within a filter module with advantage, whereby the porosity of the individual filter layer rings/filter elements within the same filter module diminishes in the direction of flow-through.

Conventionally, cellulose and diatomaceous earth filter layers are manufactured on a web forming machine on which a water content of approximately 98% is reduced to a residual moisture content of approximately 65%. Subsequently the bonded filter layer is dried. The invention recommends the pleating of a filter layer with a water content of at least 5% W and at most 30% W at a temperature of at most 150° C., preferably, however, at between 100° C. and 140° C. (in the case of cellulose fibers). It has been demonstrated that, with observance of these parameters, the pleating procedure can be carried out in an optimally gentle way and with the least possible risk of rupture.

In so far as the filter layer, apart from cellulose, also contains artificial fibers, the filter layer, in the case of thermoplastic artificial fibers, is to be heated during pleating to a temperature which lies below the softening or melting point of the artificial fibers. In this way it is ensured that the elasticity and the morphology (fibrillation) of the artificial fibers remain in their original state.

The wet binding occurs normally through the addition of aqueous solutions of wet binder to the pulp. The wet strength can, however, be adjusted in that a mixture of thermoplastic artificial fibers with significantly differing softening ranges are added to the cellulose pulp. In such cases the drying of the filter layer and later the pleating is carried out thermally in such a way that the object temperature lies at least 20° C. above the softening point of the lower melting point artificial fibers and on the other hand at least 20° C. below the softening point of the higher melting point fibers. Naturally, the wet binding can also be accomplished through a combination of polyelectrolyte additive and sintering of the fibers.

Figure 2:
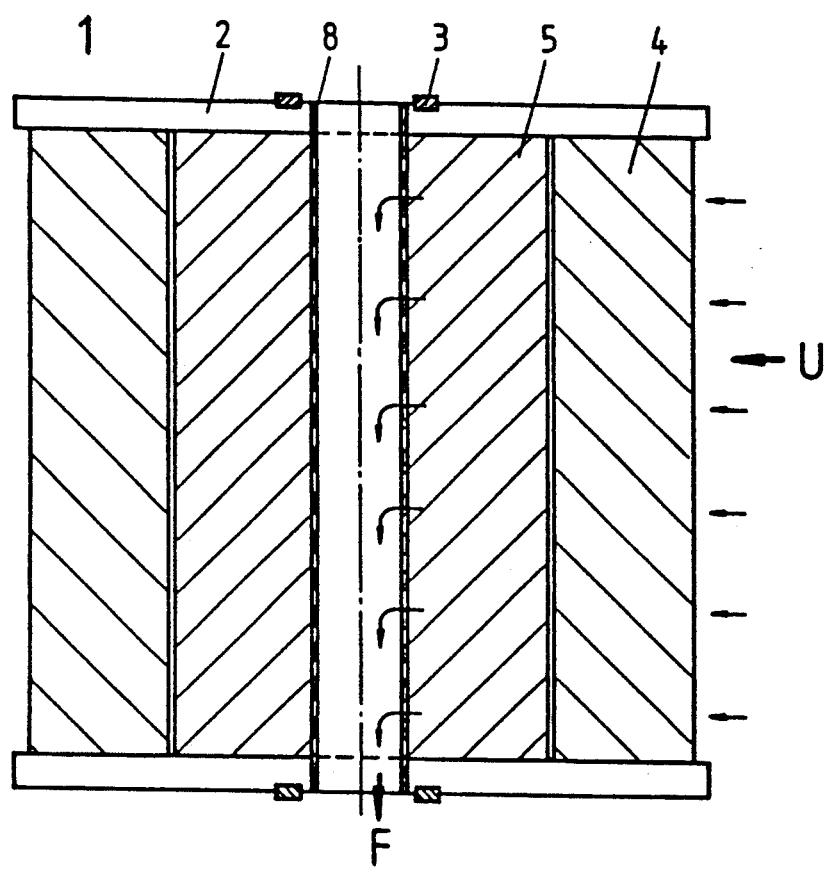
Figure 3:
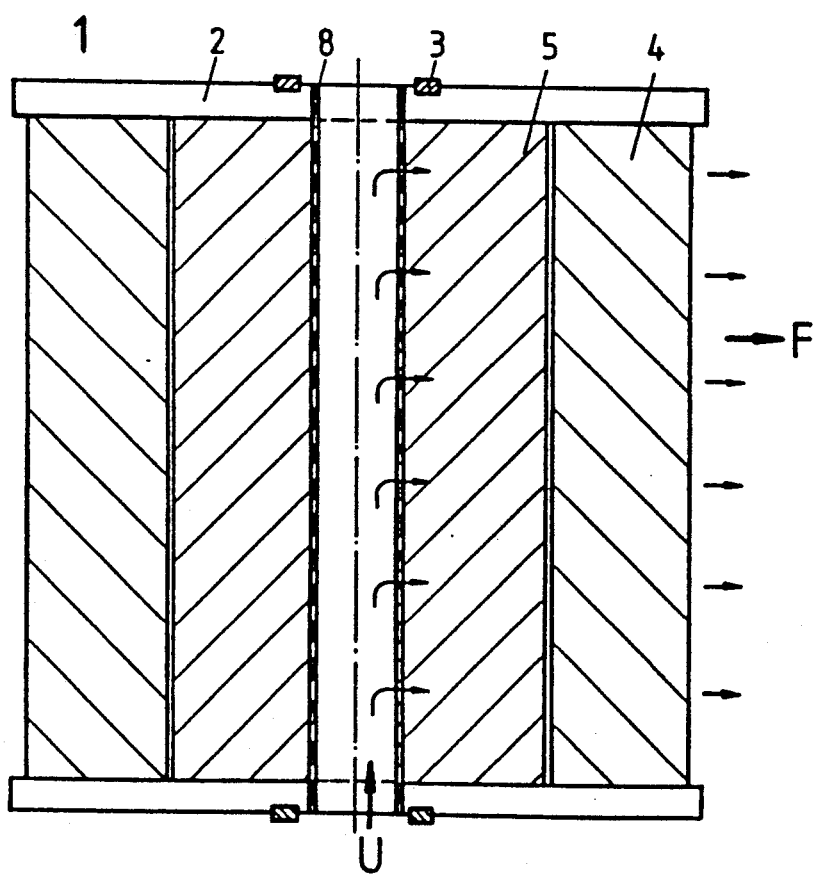
Figure 4:
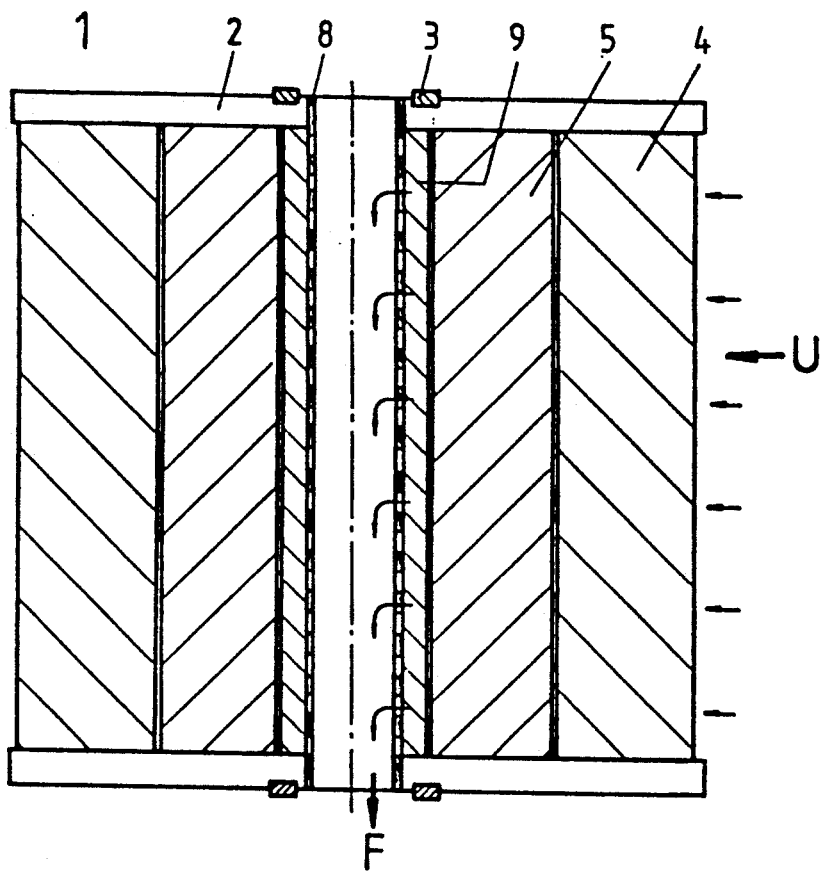
Figure 5:
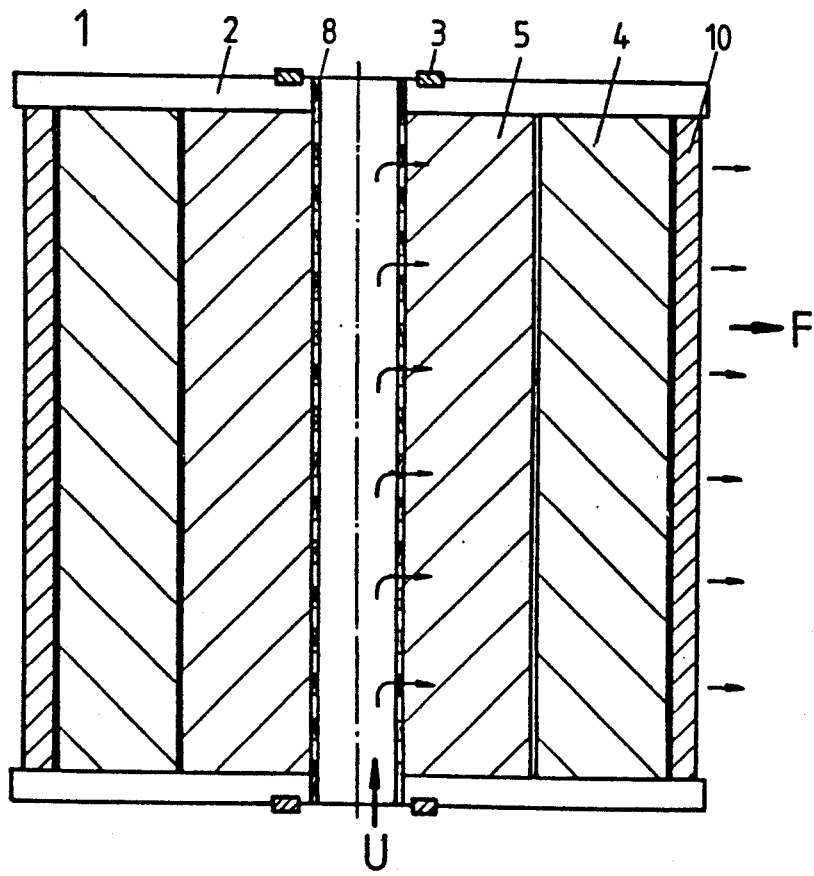
Figure 6:
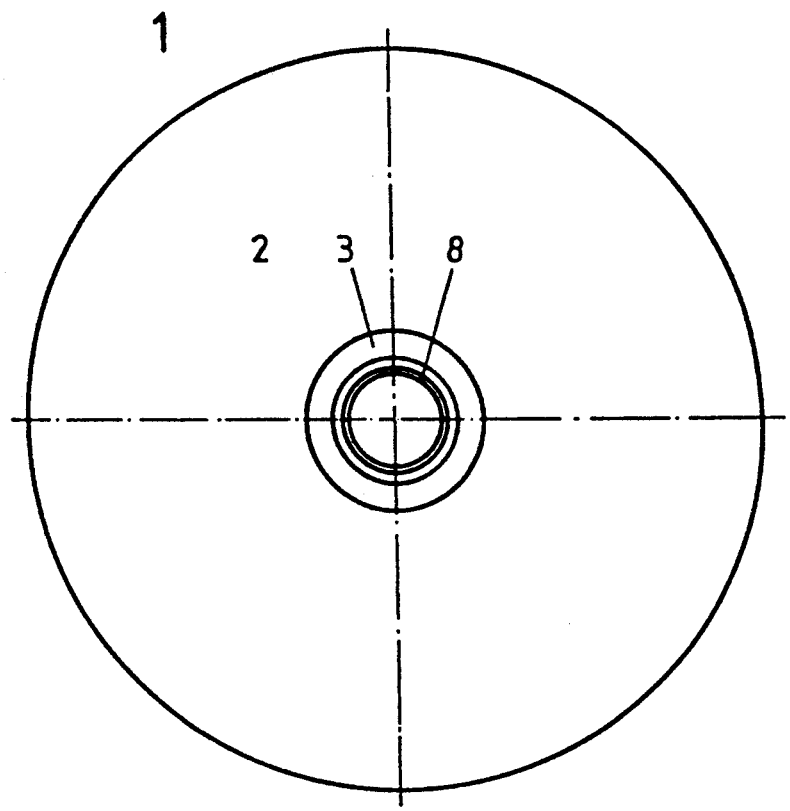
Figure 7:
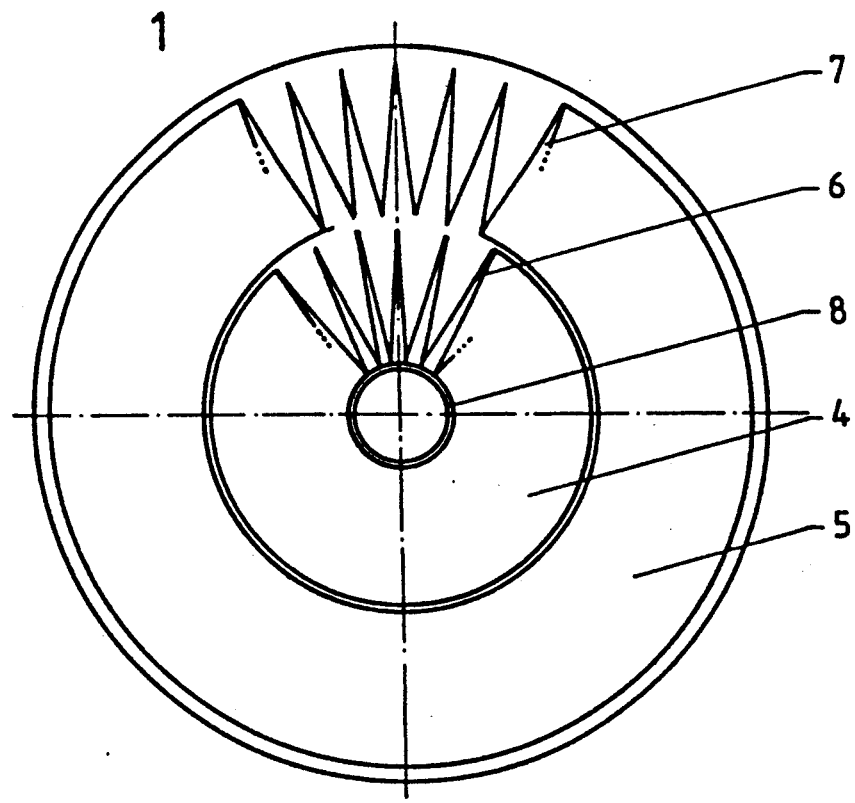
Figure 8:
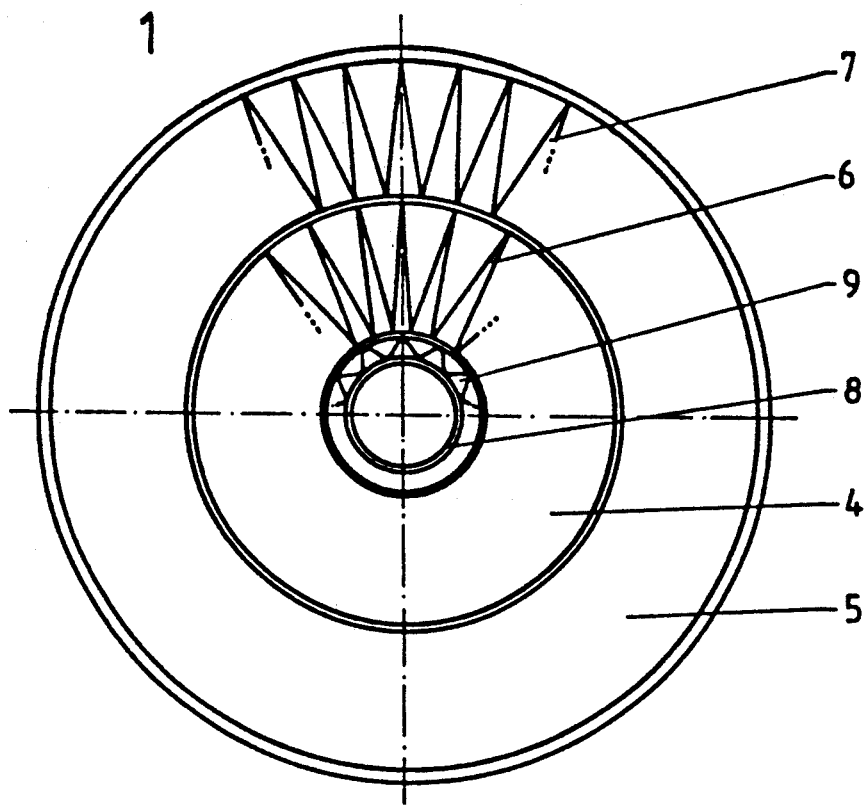
Figure 9:
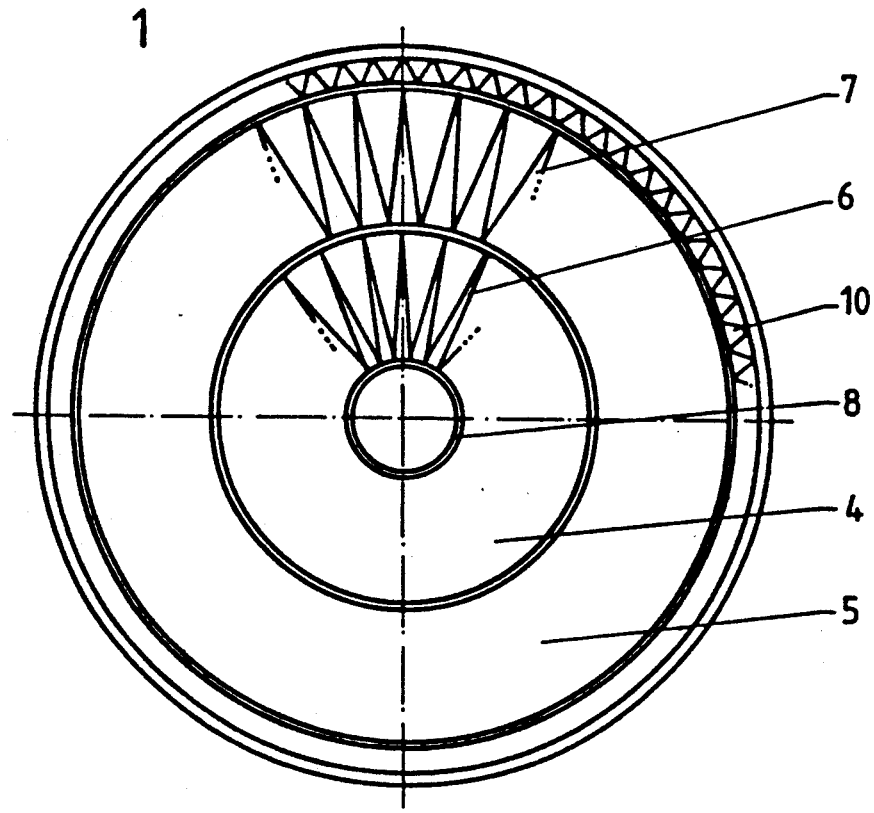
Figure 10A:
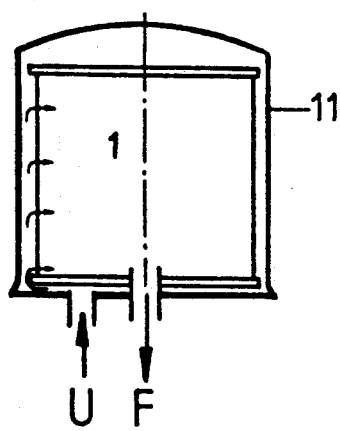
Figure 10B:
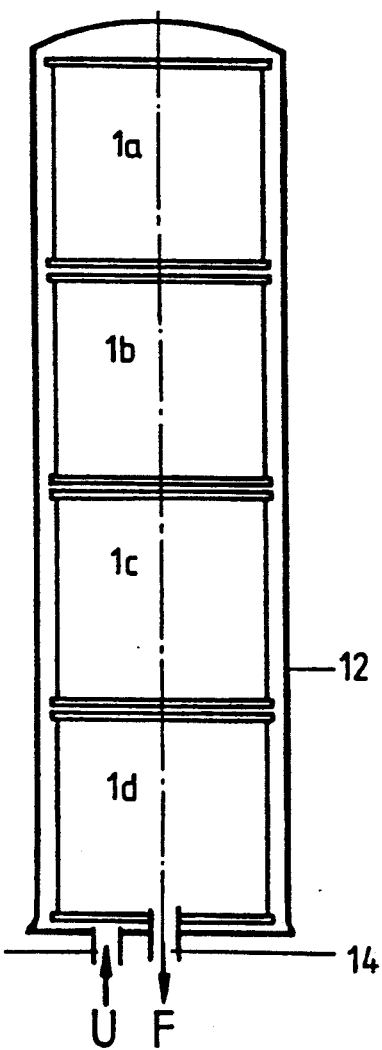
Figure 11:
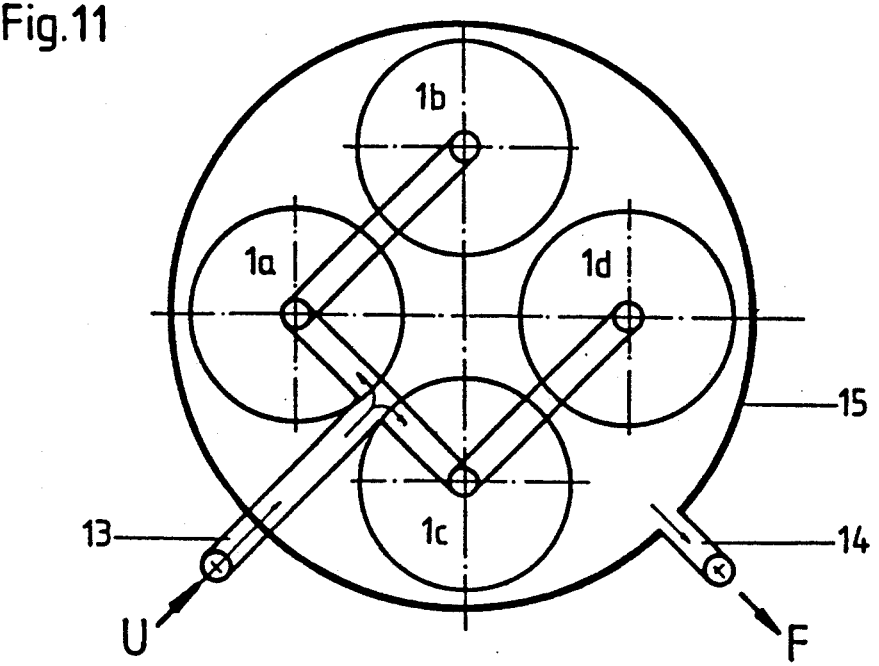
Figure 12:
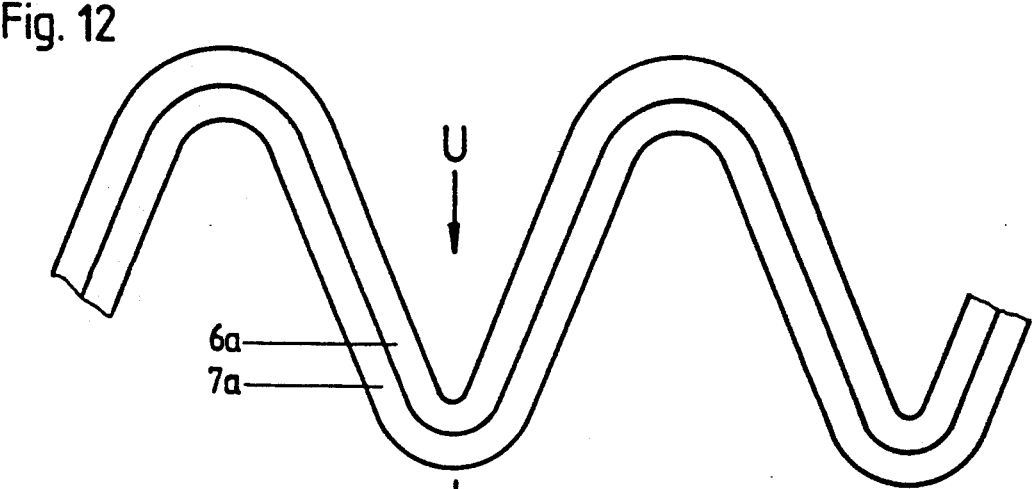
Figure 13:
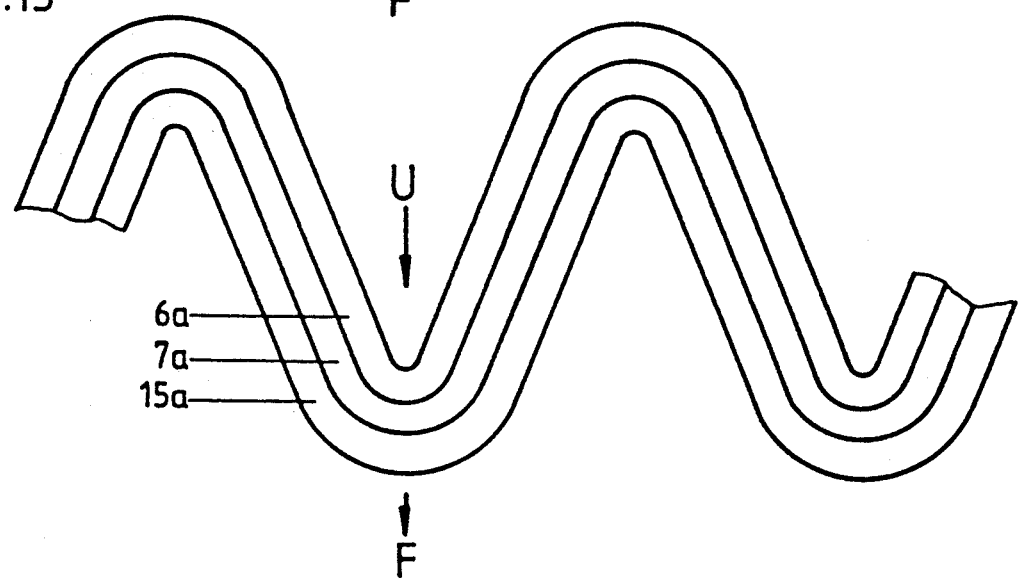
Figure 14:
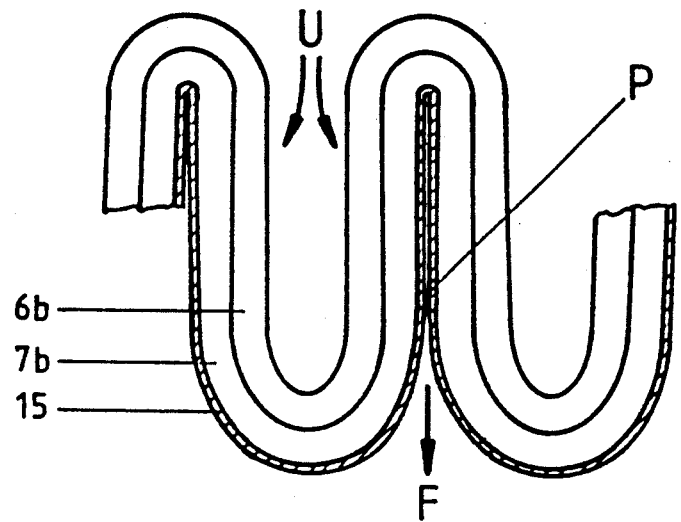

The invention is more closely explained in the following embodiments and with the aid of the drawings. Namely:

FIG. 1—the schematic representation of a filter module, in a side view, with a pleated filter layer, FIG. 2—the filter module according to FIG. 1 in section, FIG. 3—a filter module corresponding to that in FIG. 2, however operated in the reverse direction, FIG. 4—a filter module according to FIG. 2 with an additional security filter, FIG. 5—a filter module according to FIG. 3 with an additional security filter, however being operated in the reverse direction, FIG. 6—a plan view of a filter module according to FIGS. 1 to 5, FIG. 7—a horizontal part section through the filter module in the representation according to FIG. 6, FIG. 8—a horizontal part section through the filter module according to the representation in FIG. 4, FIG. 9—a horizontal part section through the filter module according to the representation in FIG. 5, FIGS. 10a, 10b and 11—the schematic representation of filter modules within filter housings of differing arrangements, FIGS. 12 and 13—simultaneously pleated multi-filter layers and FIG. 14—a pleated filter layer with the features of the invention with flow-off non-woven fabric.

For the manufacture of a pleated filter using one of the described filter layers, the filter layer material is moistened by means of a spray nozzle or a steam jet. The strip, protected with a covering paper on both sides, can, according to its composition, either run into the pleating machine without pre-heating or, however, after pre-heating up to a maximum of 150° C.

Pleating of filter layers of the type described is possible not only with a single layered strip but also simultaneously with two or three superimposed filter layer strips. In order to improve the flow-off behaviour a woven fabric, a non-woven fabric or extruded net material can be simultaneously pleated with the filter layer(s).

Filter layers of the type described can be worked mainly into modules with a cylindrical arrangement through adhesion of their seams and capping their ends with seals. A module can selectively contain either only one or numerous concentric rings of pleated filter medium. The individual rings can, according to choice, comprise a single pleated filter layer or numerous simultaneously pleated filter layers.

Through the arrangement of filter layers of differing porosity in the direction of flow, stepped filtration can be carried out with one and the same module.

The direction of filtration is reversible, thus selectively from outside inwards, or from inside outwards.

Modules of the type described are able to be rinsed in reverse flow.

Modules with simultaneously pleated multilayers per ring unavoidably possess a lower fold count per circumference on account of the greater total layer thickness and as a result of that a lower volume performance, but on the other hand the capacity for contamination retention and the service life are thereby increased.

The filter layers, according to the embodiments, exhibit the following composition:

ing 15 next to one another (and, by choice, above one another). The unfiltered matter is here fed from the inside through a pipe 13 to the modules 1a to 1d, whilst the filtered matter is collected outside withing the housing 15 and led off through a pipe 14.

| Example No. | FORMULATION EXAMPLES | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Diatomaceous earth % | 45 | 30 | 35 | 35 | 30 | 40 | 45 | 35 | — | 40 | 30 | — | 40 | 30 |
| Cellulose-long fibers % | 30 | 30 | 30 | 25 | 25 | — | — | — | — | — | — | — | — | — |
| Grinding degree Schopper Riegler | 20 | 15 | 15 | 15 | 20 | | | | | | | | | |
| Cellulose short fibers % | 25 | 20 | 15 | 15 | 15 | 30 | — | 25 | — | — | — | — | — | — |
| Grinding degree Schopper Riegler | 65 | 65 | 70 | 65 | 65 | 70 | | 70 | | | | | | |
| PE - synthetic pulp % | — | 20 | — | — | 10 | — | — | — | — | — | — | — | — | — |
| PP - synthetic pulp % | — | — | 20 | 20 | 20 | — | — | 15 | — | — | 30 | — | — | 30 |
| PP - staple fibers % (3,4 dtex/4 mm) | — | — | — | 5 | — | — | — | — | — | — | — | — | — | — |
| Linters % | — | — | — | — | — | 30 | 30 | 25 | — | — | — | — | — | — |
| Grinding degree Schopper Riegler | | | | | | 20 | 20 | 20 | | | | | | |
| Linters % | — | — | — | — | — | — | 25 | — | — | — | — | — | — | — |
| Grinding degree Schopper Riegler | | | | | | | 65 | | | | | | | |
| Ceramic fibers 1) % | — | — | — | — | — | — | — | — | 100 | 60 | 40 | — | — | — |
| Micro glass fibers 2) % | — | — | — | — | — | — | — | — | — | — | — | 100 | 60 | 40 |
| Pleating temperature °C. | 150 | ≦120 | 140 | 140 | 140 | 100 | 100 | 100 | 150 | 150 | 150 | 150 | 150 | 150 |

1) KAOWOOL-fibers/Dyko-Morgan Fiber technology GmbH, D-4000 Dusseldorf 11
2) BAYER AG, D-5090 Leverkusen FIGS. 1, 6 and 7 show a filter module 1 with a disk shaped plastic seal 2 applied to each of the two faces, on which sealant rings 3 are provided for the connection of a pipe which is not portrayed here. Cylindrical filter elements 4 and 5 are connected to the seals 2.

As can mainly be seen in FIGS. 7 to 9, the filter elements 4 and 5 comprise pleated filter layers 6, 7.

In the case of the embodiment according to FIGS. 2 and 4, the unfiltered matter U is fed to the filter module 1 from outside so that it flows firstly through the filter element 4 and then through the filter element 5, and is then led off through the schematically represented perforated tube 8. With the embodiment according to FIG. 2, the outer filter layer corresponds to the layer number 2 in the preceding table. The degree of grinding of the long fiber portion amounts to 15 degrees Schopper Riegler. The inner layer 5 exhibits a higher degree of grinding of 20 degrees Schopper Riegler according to layer number 1 in the preceding table.

In the embodiment according to FIGS. 3 and 5, the unfiltered matter U is fed through the perforated pipe 8 so that the filter element 1 is flowed through from inside outwards. The inner layer corresponds to the layer number 5 and the outer layer corresponds to layer number 4, according to the preceding table.

With the embodiments according to 4 and 8, respectively 5 and 9, on the downstream side—thus "inside" in FIGS. 4 and 8 and "outside" in FIGS. 5 and 9—additional security filters (membrane filters) 9 respectively 10 are provided.

FIG. 10a shows an arrangement of an individual filter module within a housing 11, into which, in a known way, unfiltered matter is fed, and filtered matter is drawn off.

FIG. 10b shows an arrangement whereby numerous filter modules 1a, 1b, 1c and 1d are arranged within a common housing 12. The unfiltered matter is fed through the pipe 13 and flows through the filter modules 1a to 1d, parallel from outside inwards. The filtered matter, after passing through the perforated tubes which are connected with one another, is led away by means of the pipe 14, according to FIGS. 1 to 9.

FIG. 11 shows an arrangement with which the filter modules 1a to 1d are arranged within a common hous- In FIGS. 10b and 11, the suggested flow directions are reversible.

FIG. 12 shows an embodiment whereby two filter layer strips 6a, 7a are both pleated together. The strip 6a comprises the layer number 4 and the strip 7a comprises the layer number 3, according to the preceding table. The flow-through direction of the unfiltered matter U is depicted in FIG. 12 by the arrow.

FIG. 13 shows a simultaneously pleated triple filter layer with three filter layers 6a, 7a and 15a which can become increasingly finely pored in the direction of filtration.

FIG. 14 shows an arrangement whereby an additional nonwoven fabric 15 is applied to two simultaneously pleated filter layers 6b and 7b which is itself likewise pleated.

If two neighbouring filter layers, for example through mechanical distortion of as a result of pressure of the unfiltered matter, are pressed onto one another, as suggested at point 9, there is a risk that the layers pressing upon one another act as a seal so that the unfiltered matter U no longer can flow unrestricted through the filter layers 6b, 7b. By means of the non-woven fabric 15, the filter layers 7b are however maintained at a distance from one another so that with this kind of deformation or impediment the filtration performance will not reduce. Naturally, single filter layers can also be strengthened with a non-woven fabric 15 applied to the described material.

What is claimed is:

1. Deep bed filter having a layer thickness of at least 1 mm with a pleated, self supporting filter layer which contains a mixture of long fibered material and short fibered material,
   wherein the fibers comprise cellulose and/or artificial fibers or glass fibers, and wherein said filter layer, in relation to its total weight, contains at least 20% long fibers with a length of between 1 mm to 6 mm, at least 10% by weight of the total weight being long fibers with a length of approximately 3 mm to 6 mm.

2. Deep bed filter according to claim 1, characterized in that the filter layer contains at least 5% W long fibers with a length of approximately 3 to 6 mm.

3. Deep bed filter according to claim 1 or 2, wherein the filter layer contains at least 10% W long fibers with a length of 1 to 3 mm.

4. Deep bed filter according to claim 2, wherein the long fiber portion of 1 to 6 mm amounts to at the most 50% W.

5. Deep bed filter according to one of claims 2, 3, or 4, wherein the filter layer, in relation to its total weight, contains at least 20% W short fibers with a length less than 1 mm.

6. Deep bed filter according to claim 5, wherein the portion of short fibers amounts to at the most 50% W.

7. Deep bed filter with a layer thickness of at least 1 mm with a pleated, self supporting filter layer which contains a mixture of long fibered material and short fibered material, whereby the fibers comprise cellulose and/or artificial fibers or ceramic fibers or glass fibers and wherein the filter layer, in relation to its total weight, contains at least 20% W and at most 50% W long fibers with a length of 1 to 6 mm and whereby the filter layer contains at least 5% W long fibers with a length of approximately 3 to 6 mm.

8. Deep bed filter according to claim 7, wherein the filter layer contains at least 10% W long fibers with a length of 1 to 3 mm.

9. Deep bed filter according to claim 7, wherein the filter layer, in relation to its total weight, contains at least 20% W short fibers with a length of less than 1 mm.

10. Deep bed filter according to claim 9, wherein the portion of short fibers amounts to at the most 50% W.

11. Deep bed filter according to one of claims 2, 3, 5, 8, 9, or 10, wherein the cellulose fibers are ground to a value of 12 to 25 degrees Schopper Riegler.

12. Deep bed filter according to one of claims 2, 3, 5, 8, 9, 10, or 11, wherein the portion of diatomaceous earth and/or perlite is greater than 20% and less than 50% of the weight of the filter layer.

13. Deep bed filter according to one of claims 2, 3, 5, 8, 9, 10 or 11, wherein the filter layer contains artificial fibers, preferably polyolefine fibers.

14. Deep bed filter according to claim 10, wherein the portion amounts to approximately 40% W.

15. Deep bed filter according to claim 1 or claim 7, wherein said filter layer contains ceramic fibers with a fiber length of less than 6 mm.

16. Deep bed filter according to claim 1 or claim 7, wherein said filter layer contains micro-glass fibers with a fiber length of less than 6 mm.

17. Deep bed filter according to claim 1 or claim 7, wherein said filter layer contains diatomaceous earth.

18. Deep bed filter according to claim 1 or claim 7, wherein said filter layer contains perlite.

* * * * *